US008141018B1

(12) United States Patent
Guzy

(10) Patent No.: US 8,141,018 B1
(45) Date of Patent: Mar. 20, 2012

(54) METHOD AND APPARATUS FOR USING SLACK POTENTIAL DATA TO DESIGN A SYSTEM ON A FIELD PROGRAMMABLE GATE ARRAY

(75) Inventor: Przemek Guzy, Richmond Hill (CA)

(73) Assignee: Altera Corporation, San Jose, CA (US)

( * ) Notice: Subject to any disclaimer, the term of this patent is extended or adjusted under 35 U.S.C. 154(b) by 436 days.

(21) Appl. No.: 12/319,954

(22) Filed: Jan. 14, 2009

(51) Int. Cl.
*G06F 17/50* (2006.01)
(52) U.S. Cl. ......... 716/113; 716/116; 716/122; 716/134
(58) Field of Classification Search .................. 716/113, 716/116, 122, 134
See application file for complete search history.

(56) References Cited

U.S. PATENT DOCUMENTS

| 5,218,551 | A | * | 6/1993 | Agrawal et al. | 716/113 |
|---|---|---|---|---|---|
| 5,461,576 | A | * | 10/1995 | Tsay et al. | 716/113 |
| 5,521,837 | A | * | 5/1996 | Frankle et al. | 716/113 |
| 5,648,913 | A | * | 7/1997 | Bennett et al. | 716/113 |
| 5,896,301 | A | * | 4/1999 | Barrientos | 716/113 |
| 6,272,668 | B1 | * | 8/2001 | Teene | 716/113 |
| 7,207,020 | B1 | * | 4/2007 | Fung et al. | 716/113 |
| 7,376,924 | B2 | * | 5/2008 | Curtin et al. | 716/122 |
| 7,657,857 | B2 | * | 2/2010 | Guzy et al. | 716/118 |
| 7,895,539 | B2 | * | 2/2011 | Carney et al. | 716/132 |
| 7,895,556 | B2 | * | 2/2011 | Kotecha et al. | 716/108 |
| 2007/0164785 | A1 | * | 7/2007 | He | 326/41 |

* cited by examiner

*Primary Examiner* — Naum Levin
(74) *Attorney, Agent, or Firm* — L. Cho

(57) ABSTRACT

A method for designing a system to be implemented on a target device includes computing slack potential of paths between components on the target device after timing analysis. A graphical representation of the slack potential and slack for the paths is generated. The graphical representation identifies that a design change is required for a first portion of the system associated with a first path and that a change in placement is required for a second portion of the system associated with the second path.

22 Claims, 6 Drawing Sheets

US 8,141,018 B1

METHOD AND APPARATUS FOR USING SLACK POTENTIAL DATA TO DESIGN A SYSTEM ON A FIELD PROGRAMMABLE GATE ARRAY

TECHNICAL FIELD

Embodiments of the present invention relate to tools such as electronic design automation (EDA) tools for designing systems on target devices such as field programmable gate arrays (FPGAs). More specifically, embodiments of the present invention relate to a method and apparatus for using slack potential data to design a system on a FPGA.

BACKGROUND

Logic devices such as FPGAs are used to implement large systems that may include million of gates and megabits of embedded memory. The complexity of large systems often requires the use of EDA tools to create and optimize a design for the system onto physical target devices. Among the procedures performed by EDA tools in a computer aided design (CAD) flow are synthesis, placement, and routing. Even with the assistance of EDA tools, timing requirements for the system design may still not be satisfied after several iterations of the CAD flow.

The speed of the circuitry in a system is determined in part by the length of the wires between registers and the number of circuit elements a signal has to travel between registers. Generally, it is desirable to minimize these conditions. Various tools and procedures are available to assist in the design process to improve timing of the system including register transfer language (RTL) timing viewers, statistical static timing analysis (SSTA) based timing estimates, and other techniques.

However, even with these tools and procedures, designers still have difficulty determining reasonable performance expectations given a current implementation of a system design on a target device. In addition, identifying parts of the system design that should have placement constrained and parts of the hardware description language that need to be changed in order to improve performance remain a challenge.

SUMMARY

According to an embodiment of the present invention, slack and slack potential for paths in a system design implemented on a target device are analyzed to identify changes which can be made to improve timing along the paths. Positive slack may be defined as the amount of time by which a signal reaches a destination ahead of a timing requirement. Negative slack may be defined as the amount of time by which a signal misses a timing requirement. Slack potential may be defined as the difference between slack and slack that would be achieved if the routing delay were reduced to a near optimum value. According to an embodiment of the present invention, sections in a system design associated with paths having a slack potential value less than or equal to its negative slack value may be identified as sections that require a design or HDL change. Sections in a system design associated with paths having a slack potential value greater than its negative slack value may be identified as sections that require a change in placement. A scatter plot may be generated by plotting the slack potential vs. slack of a path to allow a designer to identify paths with sections in the system design that require change. Alternatively, a CAD tool may perform the analysis and identify the paths for the designer.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
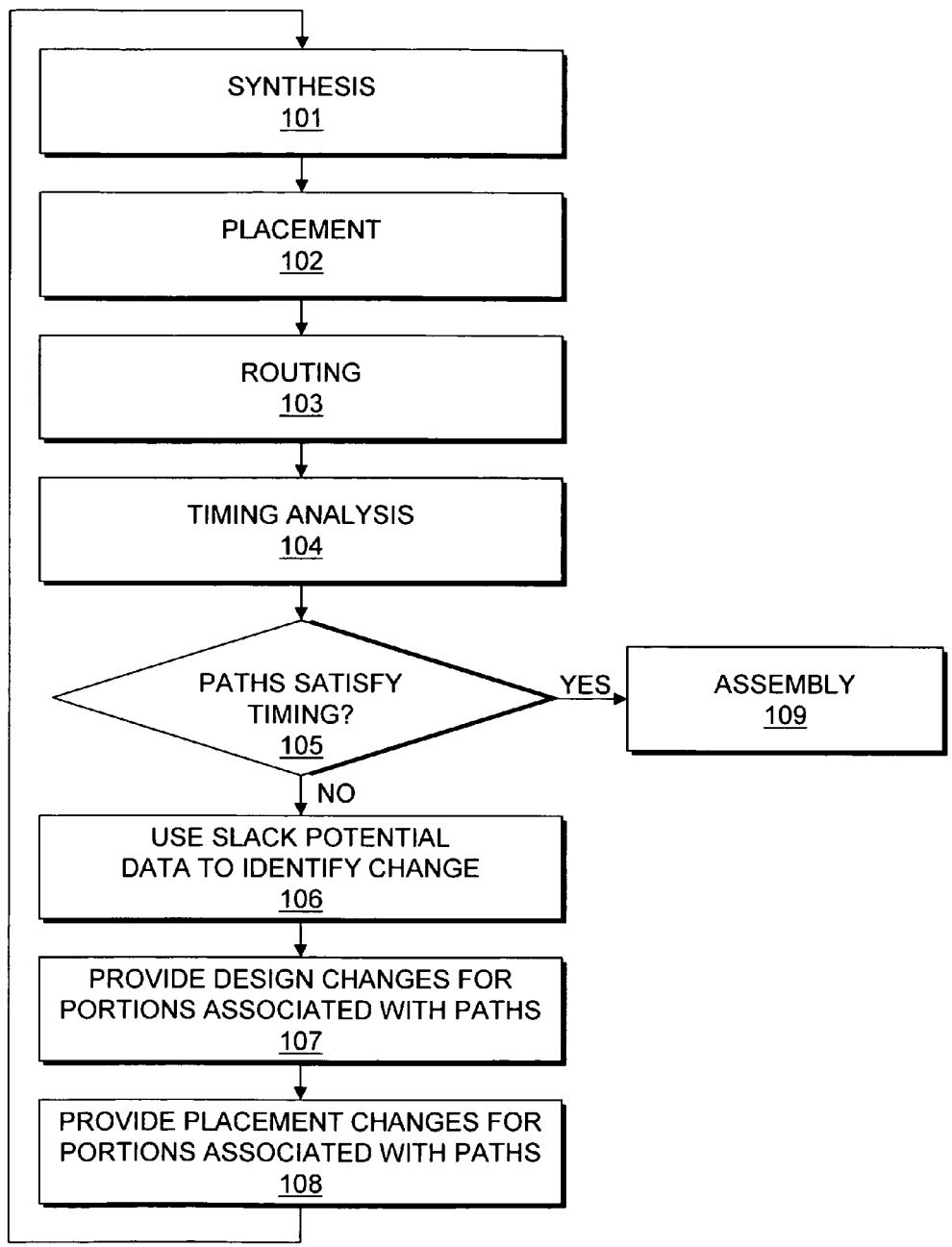
FIG. 1 is a flow chart illustrating a method for designing a system on a target device according to an exemplary embodiment of the present invention.

FIG. 1 is a flow chart illustrating a method for designing a system on a target device according to an embodiment of the present invention. The procedure shown in FIG. 1 may be performed by an EDA tool such as a system designer implemented on a computer system. The computer system may include a plurality of processors or processor cores capable of being utilized to execute a plurality of threads that may perform various tasks in parallel.

At 101, synthesis is performed on a design of a system. According to an embodiment of the present invention, synthesis generates an optimized logical representation of the system from a HDL design definition. The optimized logical representation of the system may include a representation that has a minimized number of functional blocks such as logic gates, logic elements, and registers required for the system. Technology mapping is also performed on the optimized logic design. Technology mapping includes determining how to implement logic gates and logic elements in the optimized logic representation with resources available on the target device. The resources available on the target device may be referred to as "cells" or "components" and may include logic-array blocks, registers, memories, digital signal processing blocks, input output elements, and other components. According to an embodiment of the present invention, an optimized technology-mapped netlist (cell netlist) is generated from the HDL.

At 102, the mapped logical system design is placed. Placement works on the optimized technology-mapped netlist to produce a placement for each of the functional blocks.

According to an embodiment of the present invention, placement includes fitting the system on the target device by determining which resources (components) available on the target device are to be used for specific function blocks in the optimized technology-mapped netlist. According to an embodiment of the present invention, placement may include clustering which involves grouping logic elements together to form logic clusters such as logic array blocks present on the target device.

At 103, it is determined which routing resources should be used to connect the components in the target device implementing the functional blocks of the system. During routing, routing resources on the target device are allocated to provide interconnections between logic gates, logic elements, and other components on the target device. The routing procedure may be performed by a router in an EDA tool that utilizes routing algorithms.

At 104, timing analysis is performed on the design of the system after synthesis, placement, and routing. According to an embodiment of the present invention, timing analysis involves obtaining the timing required for transmitting signals along paths in the system. A path may include one or more connections that route a signal from a source to a destination. The path may include routing resources, such as wires selected during routing, and components, such as those selected during placement, which a signal travels through. The timing may be computed by performing simulations, using pre-computed information on tables, and/or other techniques and procedures. The timing information computed may include the slack for each path in the system. Positive slack may be defined as the amount of time which a signal on a path reaches a destination ahead of a timing requirement. Negative slack may be defined as the amount of time which a signal on a path misses a timing requirement.

At 105, it is determined whether the paths in the design of the system satisfy timing requirements. If the paths in the design of the system do not satisfy timing requirements, control proceeds to 106. If the paths in the design of the system satisfy timing requirements, control proceeds to 109.

At 106, slack potential is used to identify changes to be made on the design of the system that may allow the paths to satisfy timing requirements. Slack potential may be defined as the difference between the current slack and the slack that would be achieved if the routing delay were reduced to a near optimum value. According to an embodiment of the present invention, for each path selected, the relationship between the path's slack and slack potential is used to determine whether a portion in the design associated with the path should be changed, whether a portion in the design associated with the path should have its placement changed, or whether nothing should be done despite the path not satisfying its timing requirement.

At 107, design changes are provided to portions in the design of the system identified that require a design change. According to an embodiment of the present invention, the design change involves changing the HDL of the design. The changes may be provided by a designer of the system or alternatively the changes may be provided by the EDA tool performing the synthesis procedure described at 101 or by another tool.

At 108, placement changes are provided to portions in the design of the system identified that require a change in placement. According to an embodiment of the present invention, changes in placement may include providing placement constraints to the placement procedure, including post compilation placement changes, and/or performing floorplanning. The changes may be provided by a designer of the system or alternatively the changes may be provided by the EDA tool performing the placement described at 102 or by another tool.

It should be appreciated that the extent that procedures 107 and 108 are used and whether procedures 107 and 108 are used at all depends on the analysis performed at 106. For example, it may be determined at 106 that only placement changes are required on the design for the system or that neither placement changes nor design changes are required. Thus, it should be appreciated that one or both of procedures 107 and 108 may be bypassed during the flow. The design changes and placement changes described at 107 and 108 may be provided manually by a human designer. Alternatively, it should be appreciated that the design changes and placement changes described at 107 and 108 may be automatically provided in whole or in part by an EDA tool.

Control proceeds to the appropriate portions of the flow where any of the changes provided at 107 and 108 may be implemented in the design of the system. According to an embodiment of the present invention, control returns to 101 where any design changes on portions in the design of the system made at 107 are re-synthesized, and any changes to placement may be implemented at 102 are thereafter as determined at 108. It should be appreciated that one or more or all of the procedures 101-103 may be performed after the changes have been provided at 107 and/or 108. Timing analysis 104 is then performed on the changed design of the system to determine whether timing has been satisfied or whether slack potential data should be used to identify additional changes to be made.

At 109, an assembly procedure is performed. The assembly procedure involves creating a data file that includes some of the information determined by the procedures described at 101-108. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

Figure 2:
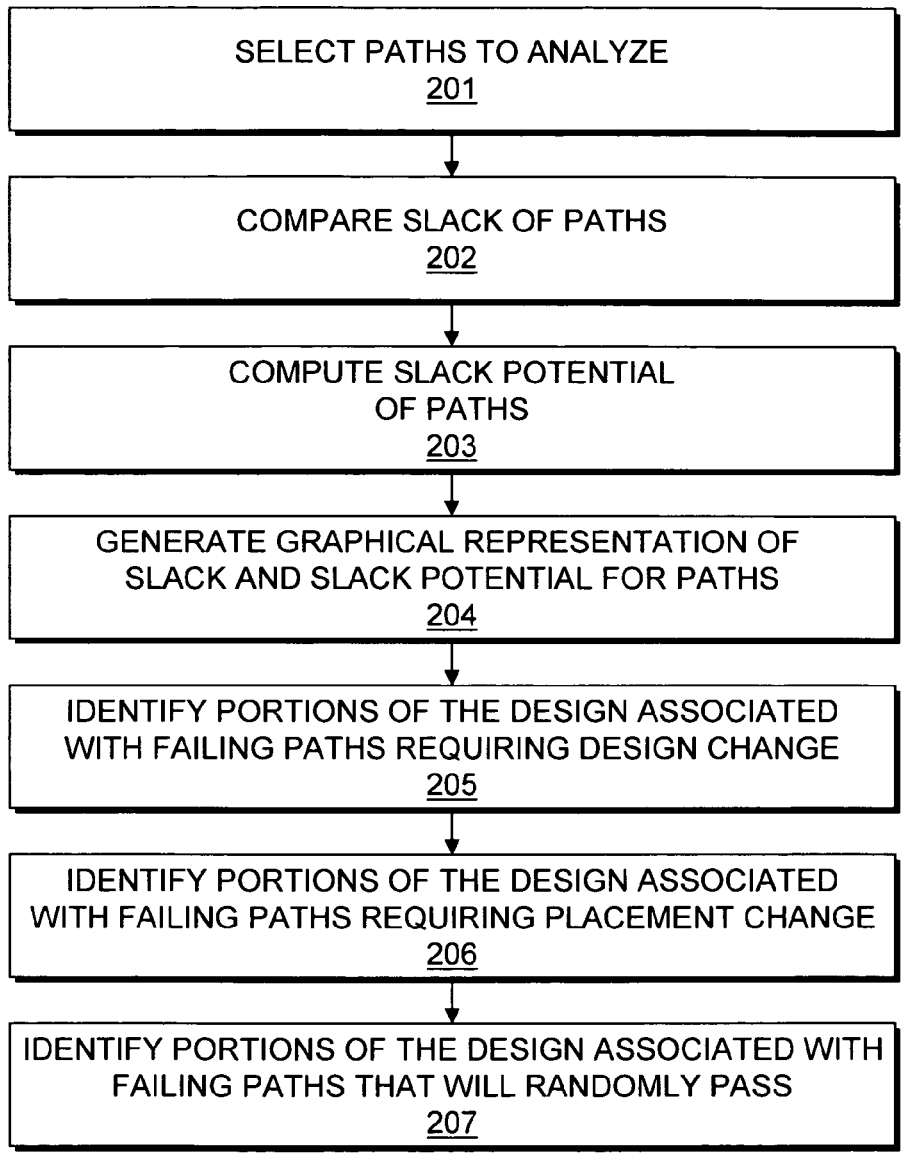
FIG. 2 is a flow chart illustrating a method for utilizing slack potential to identify portions in a system to change according to an exemplary embodiment of the present invention.

FIG. 2 is a flow chart illustrating a method for utilizing slack potential to identify portions in a system to change according to an exemplary embodiment of the present invention. The procedure described in FIG. 2 may be used to implement 106 illustrated in FIG. 1.

At 201, paths to be analyzed are selected. Paths that are selected may include, for example, path that fail to satisfy timing requirements as determined by timing analysis, paths that are associated with an identified source and/or destination, all paths in the design of the system, a set of n paths that fail timing requirements by the largest amount of time (where n can be any number), or other sets of paths. It should be appreciated that the paths identified above may be automatically selected by an EDA tool or manually selected by a human designer.

At 202, the slack for the paths are computed. According to an embodiment of the present invention, the slack for the paths may be obtained from a timing analysis procedure such as 104 shown in FIG. 1 if the timing analysis procedure computes slack for paths. Alternatively, the slack may be computed independently using timing data from timing analysis and the timing requirements for the paths.

At 203, slack potential is computed for the paths. Slack potential may be defined as the difference between slack for a path and slack that would be achieved if the routing delay were reduced to a near optimum value. According to an embodiment of the present invention, the near optimum routing delay for a given connection may be determined by using a fixed value. The fixed value would represent the smallest possible routing delay available in a given target device and would be used for all connections. Alternatively, the near optimum routing delay may be determined by using a look up table. Depending on the type of connection, a different routing delay could be used. For example, carry chains may be assigned a very small delay value (near zero), where other connections would be assigned a larger delay value. The near optimum routing delay may also be determined using a heuristic algorithm. The algorithm may take into account factors such as a number of fan-outs on the connection, system utilization, and routing delay previously computed for connections on the path. The near optimum routing delays are used to compute estimated timing values for each path selected. From the estimated timing values, the new slack and consequently the slack potential for each path is determined.

At 204, a representation of the slack potential and slack for the paths is generated and displayed to a designer. The graphical representation may be scatter plot where each path is plotted with its slack on the y-axis and its slack potential on the x-axis. According to an embodiment of the present invention, the graphical representation is output on a screen, to a data file, a printer, and/or another device or medium.

At 205, portions in the design associated with paths requiring a design change are identified. According to an embodiment of the present invention, paths with slack potential values smaller than their negative slack values (slack+slack potential<0) are identified as paths with associated portions in the design that require more than placement optimizations. To significantly improve the slack on these paths, a change in the design may be necessary. It should be appreciated that different criteria for identifying paths that require a design change may be used.

At 206, portions in the design associated with paths requiring a placement change are identified. According to an embodiment of the present invention, paths with slack potential values larger than their negative slack value (slack+slack potential>0) are identified as paths with associated portions in the design that could possibly improve using placement changes. The placement changes may include applying constraints, post compilation placement changes, or floor planning. It should be appreciated that different criteria for identifying paths that require a placement change may be used.

At 207, portions in the design associated with failing paths that may randomly pass without performing any changes are identified. According to an embodiment of the present invention, paths with very small negative slack values or having lines connecting its plots from the origin with slopes of negative 0.05 and greater are identified as paths with associated portions in the design that could possibly improve and pass timing requirements with random fitting/routing. These paths may be identified as paths that do not require design or placement changes. It should be noted that paths with small positive slack values or having a lines connecting its plots from the origin with slopes of positive 0.05 and less are identified as paths with associated portions in the design that could possibly worsen and fail timing requirements with random fitting/routing. Appropriate action may be taken for the paths identified at 207 depending on the time and resources available. It should be appreciated that depending on the placement and routing procedure used, the slope may be adjusted so that a slope other than positive/negative 0.05 may be used.

It should be appreciated that a designer reviewing the graphical representation of the slack potential and slack for the paths may identify portions of the design associated with paths requiring design changes and placement changes. In this embodiment, the graphical representation may be selectable. For example, a user may use an input device such as a mouse or other device to select a path on the graphical representation. The EDA tool would identify and output information such as source and destination registers of the path and circuit elements on the path. The EDA tool may obtain this information, for example, from its timing analysis unit. From the information of a path's source and destination registers and circuit elements, a portion of the system design that requires change can be identified. According to an embodiment of the present invention, the graphical representation of the slack potential and slack for the paths may be output on a screen, to a data file, a printer, and/or another device or medium.

Alternatively, an EDA tool may be programmed to identify portions of the design associated with paths requiring design changes and placement changes from the slack potential and slack for the paths without having to generate the graphical representation of the slack and slack potential for the paths.

Figure 3:
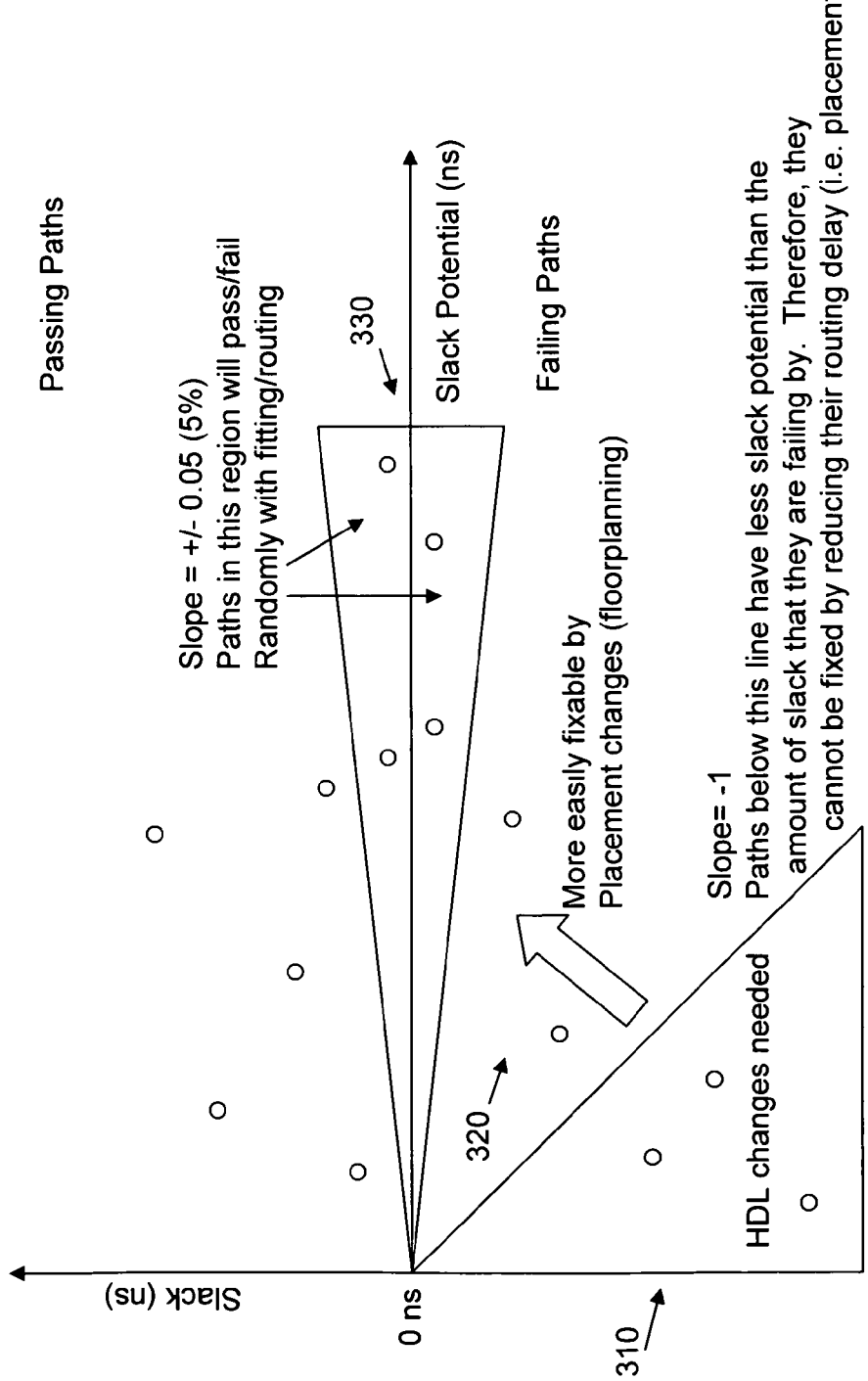
FIG. 3 illustrates a scatter plot graph of slack potential vs. slack for paths according to an exemplary embodiment of the present invention.

FIG. 3 illustrates a scatter plot graph of slack potential vs. slack for paths according to an exemplary embodiment of the present invention. The slack for each path is plotted along the x-axis and the slack potential for each path is plotted along the y-axis. Paths plotted above the x-axis represent paths that satisfy timing requirements. Paths plotted below the x-axis represent paths that missed timing requirements.

Paths with slack potential values smaller than their negative slack value (slack+slack potential<0) are plotted in first section 310 of the graph. The first section 310 can be identified as a section in the graph below a line crossing the origin having a slope of −1. Paths below this line may be identified as paths that require a design change.

Paths with slack potential values larger than their negative slack value (slack+slack potential>0) are plotted in a second section 320 of the graph. The second section 320 can be identified as a section in the graph above a line crossing the origin having a slope of −1. Paths above this line may be identified as paths may be improved by placement changes.

Paths with small positive or negative slack values having relatively larger slack potential values are plotted in a third section 330 of the graph. The third section 330 can be identified as a section in the graph below/above a line crossing the origin having a slope of +/−0.05. Paths in the third section 330 may be identified as paths that may pass/fail randomly with fitting and routing.

The scatter plot graph of slack potential vs. slack may be used by a designer to determine how feasible his design expectations are. For example, if there are just a small number of paths that are failing due to routing delay and most other paths are easily passing, then it is possible that placement changes will generate a successful design. However, if many paths are failing or near failing, then it is possible that design changes may be required or that delay requirements are unrealistic.

Figure 4:
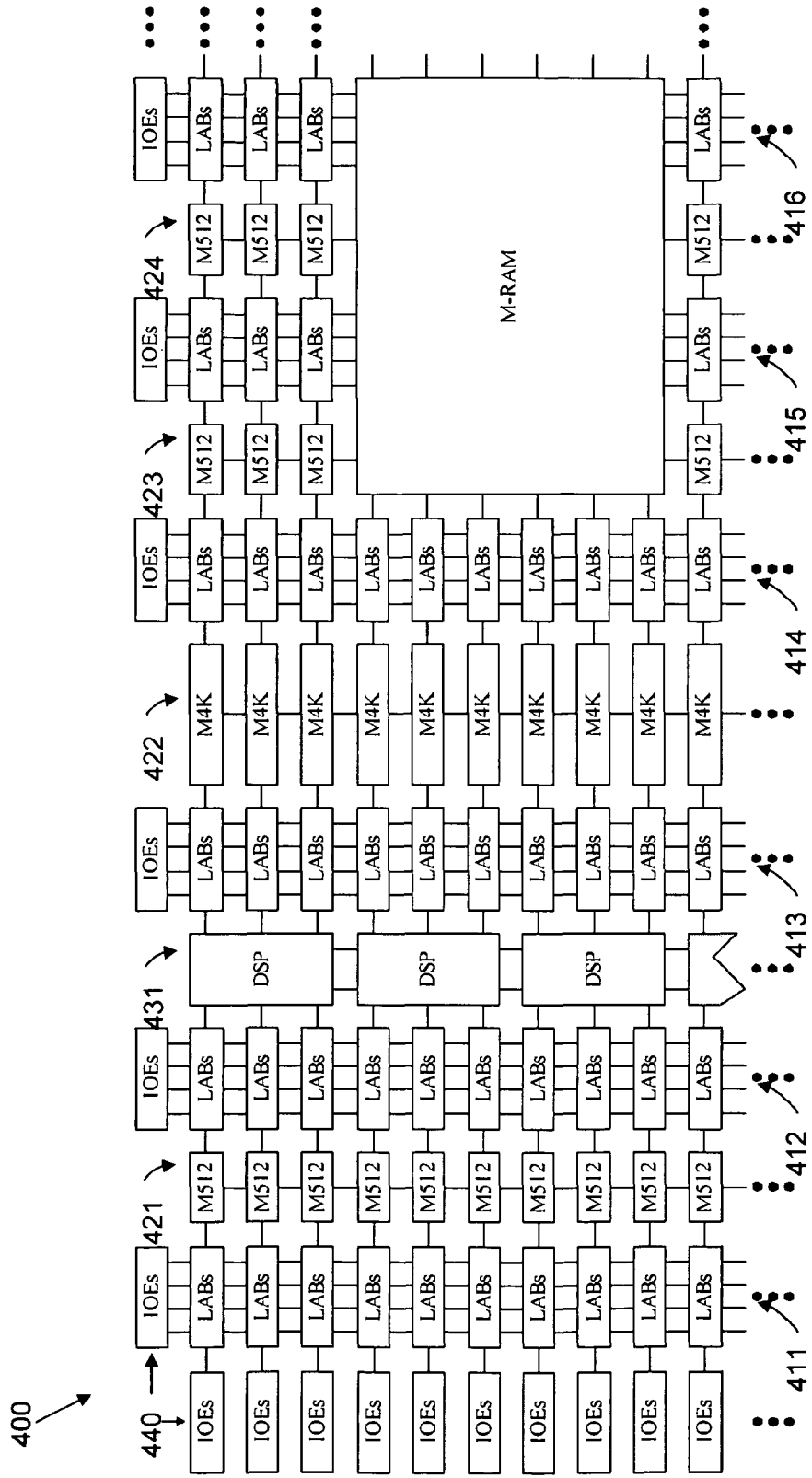
FIG. 4 illustrates a target device according to an exemplary embodiment of the present invention.

FIG. 4 illustrates an exemplary target device 400 in which a system may be implemented on according to an embodiment of the present invention. In this example, the target device 400 is an FPGA. According to one embodiment, the FPGA 400 is a chip having a hierarchical structure that may take advantage of wiring locality properties of circuits formed therein.

The target device 400 includes a plurality of logic-array blocks (LABs). Each LAB may be formed from a plurality of logic blocks, carry chains, LAB control signals, (lookup table) LUT chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input lookup table (LUT) with a configurable register. According to an alternate embodiment of the present invention, the logic block may operate similarly to an adaptive logic module (ALM), such as those found in Stratix devices manufactured by Altera Corporation. LABs are grouped into rows and columns across the target device 400. Columns of LABs are shown as 411-416. It should be appreciated that the logic block may include additional or alternate components.

The target device 400 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 400. Columns of memory blocks are shown as 421-424.

The target device 400 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 400 and are shown as 431.

The target device 400 includes a plurality of input/output elements (IOEs) 440. Each IOE feeds an IO pin (not shown) on the target device 400. The IOEs 440 are located at the end of LAB rows and columns around the periphery of the target device 400. Each IOE may include a bidirectional IO buffer and a plurality of registers for registering input, output, and output-enable signals.

The target device 400 may include routing resources such as LAB local interconnect lines, row interconnect lines ("H-type wires"), and column interconnect lines ("V-type wires") (not shown) to route signals between components on the target device.

FIG. 4 illustrates an exemplary embodiment of a target device. It should also be appreciated that, as indicated above, the target device may include the same or different semiconductor devices arranged in a different manner. The target device 400 may also include FPGA resources other than those described and illustrated with reference to the target device illustrated in FIG. 4. Thus, while embodiments of the invention described herein may be utilized on the architecture described in FIG. 4, it should be appreciated that it may also be utilized on different architectures.

Figure 5:
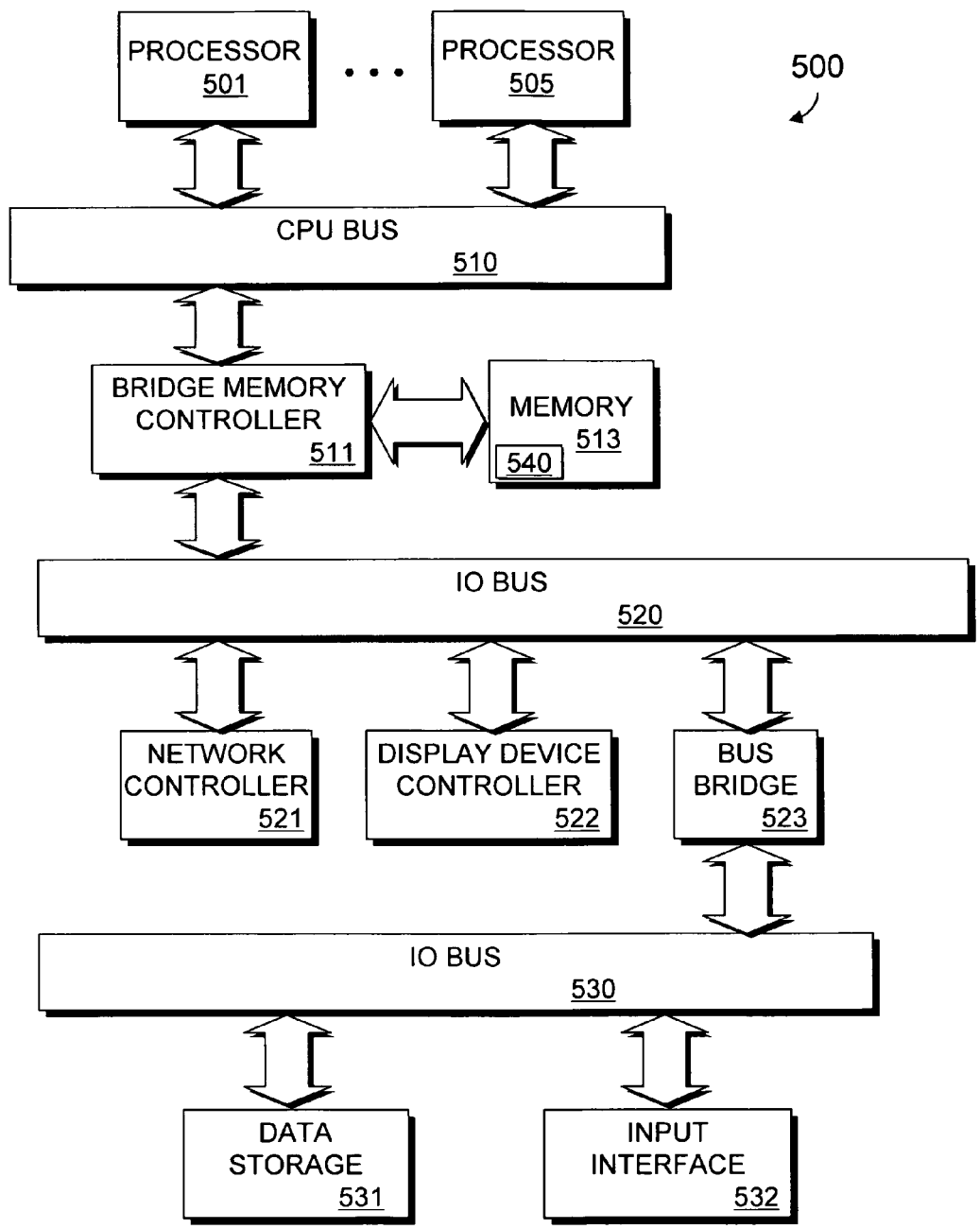
FIG. 5 illustrates a computer system for implementing a system designer according to an example embodiment of the present invention.

FIG. 5 is a block diagram of an exemplary computer system 500 in which an example embodiment of the present invention resides. The computer system 500 includes one or more processors that process data signals. As shown, the computer system 500 includes a first processor 501 and an nth processor 505, where n may be any number. The processors 501 and 505 may be multi-core processors with multiple processor cores on each chip. The processors 501 and 505 are coupled to a CPU bus 510 or other switch fabric that transmits data signals between processors 501 and 505 and other components in the computer system 500.

The computer system 500 includes a memory 513. The memory 513 may store instructions and code represented by data signals that may be executed by the processor 501. A bridge memory controller 511 is coupled to the CPU bus 510 and the memory 513. The bridge memory controller 511 directs data signals between the processors 501 and 505, the memory 513, and other components in the computer system 500 and bridges the data signals between the CPU bus 510, the memory 513, and a first IO bus 520. According to an embodiment of the present invention, the processors 501 and 505 may be directly coupled to the memory 513 and communicates with the memory 513 without a bridge memory controller 511.

The first IO bus 520 may be a single bus or a combination of multiple buses. The first IO bus 520 provides communication links between components in the computer system 500. A network controller 521 is coupled to the first IO bus 520. The network controller 521 may link the computer system 500 to a network of computers (not shown) and supports communication among the machines. A display device controller 522 is coupled to the first IO bus 520. The display device controller 522 allows coupling of a display device (not shown) to the computer system 500 and acts as an interface between the display device and the computer system 500.

A second IO bus 530 may be a single bus or a combination of multiple buses. The second IO bus 530 provides communication links between components in the computer system 500. A data storage device 531 is coupled to the second IO bus 530. An input interface 532 is coupled to the second IO bus 530. The input interface 532 allows coupling of an input device to the computer system 500 and transmits data signals from an input device to the computer system 500. A bus bridge 523 couples the first IO bus 520 to the second IO bus 530. The bus bridge 523 operates to buffer and bridge data signals between the first IO bus 520 and the second IO bus 530. It should be appreciated that computer systems having a different architecture may also be used to implement the computer system 500.

A system designer 540 may reside in memory 513 and be executed by one or more of the processors 501 and 505. The system designer 540 may operate to synthesize a system, place the system on a target device, route the system on the system on the target device, perform timing analysis, use slack potential data to identify changes to be made to the system, and modify the system based upon the changes.

Figure 6:
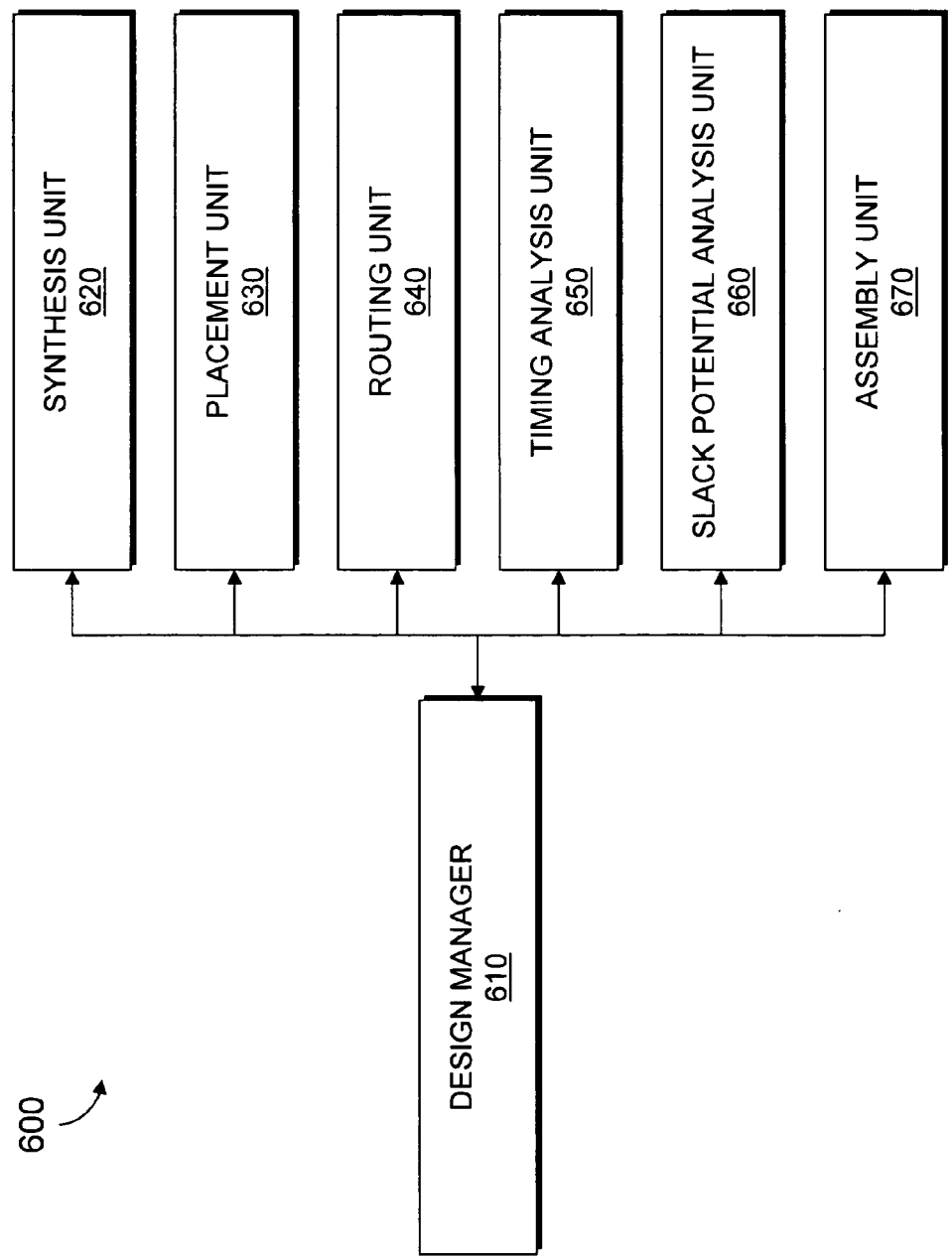
FIG. 6 illustrates a system designer according to an exemplary embodiment of the present invention.

FIG. 6 illustrates a system designer 600 according to an embodiment of the present invention. The system designer 600 may be an EDA tool for designing a system on a target device such as an FPGA or other circuitry. FIG. 6 illustrates modules implementing an embodiment of the system designer 600. According to one embodiment, the modules represent software modules and system design may be performed by a computer system such as the one illustrated in FIG. 5 executing sequences of instructions represented by the modules. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software. The system designer 600 includes a designer manager 610. The designer manager 610 is connected to and transmits data between the components of the system designer 600.

The system designer 600 includes a synthesis unit 620. The synthesis unit 620 generates a cell netlist from a design of a system to be implemented on the target device. According to an embodiment of the system designer 600, the synthesis unit 620 takes a conceptual HDL design definition and generates an optimized logical representation of the system. The optimized logical representation of the system generated by the synthesis unit 620 may include a representation that has a minimized number of functional blocks and registers, such as logic gates and logic elements, required for the system. Alternatively, the optimized logical representation of the system generated by the synthesis unit 620 may include a representation that has a reduced depth of logic and that generates a lower signal propagation delay. The synthesis unit 620 also performs technology mapping where it determines how to implement the functional blocks and registers in the optimized logic representation utilizing resources such as cells on a target. The technology-mapped netlist illustrates how the resources (cells) on the target device are utilized to implement the system. In an embodiment where the target device is an FPGA or PLD, the technology-mapped netlist may include cells such as look-up tables, Logic Array Blocks (LABs), registers, memory blocks, DSP blocks, IO elements or other components.

Block 630 represents a placement unit that performs placement. The placement unit 630 places the system on to the target device by determining which components or areas on the target device are to be used for specific functional blocks and registers. According to an embodiment of the system designer 600, the placement unit 630 first determines how to implement portions of the optimized logic design in clusters. Clusters may represent a subset of the components on the logic design. A cluster may be represented, for example, by a number of standard cells grouped together. In this embodiment, after portions of the optimized logic design are implemented in clusters, the clusters may be placed by assigning the clusters to specific positions on the target device. The placement unit 630 may utilize a cost function in order to determine a good assignment of resources on the target device.

The system designer 640 includes a routing unit 640 that performs routing. The routing unit 640 determines the routing resources on the target device to use to provide interconnection between the components implementing the functional blocks and registers of the logic design.

Block 650 represents a timing analysis unit. The timing analysis unit 650 computes the timing required for transmitting signals along different paths in the system. A path may include one or more connections that route a signal from a source to a destination. The path may include routing resources, such as wires selected during routing, and components, such as those selected during placement, which a signal travels through. The timing may be computed by performing simulations, using pre-computed information on tables, and/or other techniques and procedures. The timing information computed may include the slack for each path in the system.

Block 660 represents the slack potential analysis unit. The slack potential analysis unit 660 identifies changes to be made on the design of the system to allow the paths to satisfy timing requirements. According to an embodiment of the present invention, for each path selected, the relationship between the path's slack and slack potential is used to determine whether a portion of the design for the system associated with a path requires a design change, a placement change, or whether nothing should be done despite the path not satisfying its timing requirement. The relationship between a path's slack and slack potential may be illustrated in the form of a graphical representation to allow for a designer to make the determinations. Alternatively, the slack potential analysis unit 660 may automatically identify the required changes for portions of the design for the system associated with the paths. The slack potential analysis unit 660 may perform the procedures described in FIG. 2. The changes may be provided by a designer of the system or alternatively the changes may be provided by the synthesis unit 620 performing the synthesis procedure described at 101 and/or the placement unit 630 performing the placement procedure described at 102 (shown in FIG. 1) or be provided by another tool.

The system designer 600 includes an assembly unit 670 that performs an assembly procedure that creates a data file that includes the design of the system generated by the system designer 600. The data file may be a bit stream that may be used to program the target device. The assembly unit 600 may output the data file so that the data file may be stored or alternatively transmitted to a separate machine used to program the target device. It should be appreciated that the assembly unit 600 may also output the design of the system in other forms such as on a display device or other medium.

FIG. 6 illustrates an exemplary block diagram of a system designer 600. It should be appreciated that addition components may be implemented on the system designer 600, that not all of the components illustrated are necessary to implement the system designer 600, and that the illustrated components may be substituted with other components.

FIGS. 1 and 2 are flow charts illustrating methods according to embodiments of the present invention. The techniques illustrated in these figures may be performed sequentially, in parallel or in an order other than that which is described. The techniques may be also be performed one or more times. It should be appreciated that not all of the techniques described are required to be performed, that additional techniques may be added, and that some of the illustrated techniques may be substituted with other techniques.

Embodiments of the present invention may be provided as a computer program product, or software, that may include a machine accessible, machine readable, or computer readable medium having instructions. The instructions on the machine accessible, machine readable, or computer readable medium may be used to program a computer system or other electronic device. The machine accessible, machine readable, or computer readable medium may include, but is not limited to, floppy diskettes, optical disks, CD-ROMs, and magneto-optical disks or other type of media/medium suitable for storing electronic instructions. The techniques described herein are not limited to any particular software configuration. They may find applicability in any computing or processing environment. The terms "machine accessible medium", "machine readable medium", or "computer readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A non-transitory computer readable medium including sequences of instructions stored thereon for causing a computer to execute a method comprising:
   computing slack values for paths between components on a target device;
   computing slack potential for the paths;
   utilizing the slack values and slack potentials to identify a first portion of a system associated with a first path where a design change is required and a second portion of the system associated with a second path where a change in placement is required; and
   implementing the design change and change in placement on a system design on a programmable circuit.

2. The non-transitory computer readable medium of claim 1, wherein utilizing the slack values and slack potentials to identify a first portion of the system associated with a first path where a design change is required comprises identifying a path having a slack potential value equal to or less than its negative slack value.

3. The non-transitory computer readable medium of claim 1, wherein utilizing the slack values and slack potentials to identify a second portion of the system associated with a second path where a change in placement is required comprises identifying a path having a slack potential value greater than its negative slack value.

4. The non-transitory computer readable medium of claim 1, further comprising instructions which when executed causes the computer to perform utilizing the slack values and slack potentials to identify a third path which does not require a design change or a change in placement.

5. The non-transitory computer readable medium of claim 4, wherein utilizing the slack values and slack potentials to identify a third path which does not require a design change or a change in placement comprises identify a path having a slack potential value greater than twice its negative slack value.

6. The non-transitory computer readable medium of claim 1, further comprising instructions which when executed by the computer causes the computer to output an identity of the first portion of the system associated with a first path and an identity of the second portion of the system associated with the second path.

7. The non-transitory computer readable medium of claim 1, wherein computing slack potential for the paths comprises taking a difference between actual slack of a path from timing analysis and a slack value where routing delay is at a near optimum value.

8. The non-transitory computer readable medium of claim 7, wherein the near optimum value is determined from a fixed value used for all connections on the path that is a smallest possible routing delay available.

9. The non-transitory computer readable medium of claim 7, wherein the near optimum value is determined based upon a type of connection used for the path.

10. The non-transitory computer readable medium of claim 7, wherein the near optimum value is determined using a heuristic algorithm that takes into account a number of fan-outs on a connections of the path, routing delay previously computed for the connections, and system utilization.

11. The non-transitory computer readable medium of claim 1 further comprising instructions which when executed causes the computer to perform generating a graphical representation of the slack potential and slack values for the paths that identify that the design change is required.

12. The non-transitory computer readable medium of claim 1, wherein the first and second paths are identified by a designer and are associated with one or more of a source and destination.

13. The non-transitory computer readable medium of claim 1, wherein the first and second paths are identified as paths failing timing requirement from timing analysis.

14. The non-transitory computer readable medium of claim 1 further comprising instructions which when executed causes the computer to perform timing analysis on the system that has been synthesized, placed, and routed on the target device.

15. The non-transitory computer readable medium of claim 14 further comprising instructions which when executed causes the computer to perform:
   receiving the design change to the first portion of the system and the change in placement to the second portion of the system from a designer; and
   modifying one or more of synthesis, placement, and routing of the system on the target device in response to the design change and the change of placement.

16. A method for designing a system to be implemented on a target device, the method comprising:
   computing slack values for paths between components on the target device;
   computing slack potential for the paths after timing analysis; and
   utilizing the slack values and slack potentials to identify a first portion of the system associated with a first path where a design change is required and a second portion of the system associated with a second path where a change in placement is required, wherein at least one of the computings and utilizing is performed by a processor.

17. The method of claim 16 further comprising implementing the design change and change in placement on a system design on the target device.

18. The method of claim 16, wherein utilizing the slack values and slack potentials to identify a first portion of the system associated with a first path where a design change is required comprises identifying a path having a slack potential value equal to or less than its negative slack value.

19. The method of claim 16, wherein utilizing the slack values and slack potentials to identify a second portion of the system associated with a second path where a change in placement is required comprises identifying a path having a slack potential value greater than its negative slack value.

20. A system designer, comprising:
   a timing analysis unit operable to compute slack values for paths between components in a system;

a slack potential analysis unit operable to compute slack potential for the paths and to identify a first portion of the system associated with a first path where a design change is required and a second portion of the system associated with a second path where a change in placement is required, wherein the identifying is achieved by utilizing the slack values and the slack potential for the first path and the second path.

21. The system designer of claim 20, wherein the slack potential analysis unit is operable to output an identity of the first portion of the system associated with the first path and an identity of the second portion of the system associated with the second path.

22. The system designer of claim 20, wherein the slack potential analysis unit is operable to generate a graphical representation of the slack potential and the slack values for the paths that identifies that the design change is required.

* * * * *